(12) United States Patent
Xu et al.

(10) Patent No.: US 9,657,975 B2
(45) Date of Patent: May 23, 2017

(54) OIL BALANCING APPARATUS AND REFRIGERATION DEVICE

(71) Applicant: Danfoss (Tianjin) Ltd., Tianjin (CN)

(72) Inventors: Hongling Xu, Tianjin (CN); Leping Zhang, Tianjin (CN); Kongkham Lovan, Tianjin (CN)

(73) Assignee: Danfoss (Tianjin) Ltd., Tianjin (CN)

( * ) Notice: Subject to any disclaimer, the term of this patent is extended or adjusted under 35 U.S.C. 154(b) by 281 days.

(21) Appl. No.: 14/087,293

(22) Filed: Nov. 22, 2013

(65) Prior Publication Data

US 2014/0154105 A1   Jun. 5, 2014

(30) Foreign Application Priority Data

Dec. 3, 2012 (CN) .......................... 2012 1 0509434

(51) Int. Cl.
| | |
|---|---|
| *F25B 31/00* | (2006.01) |
| *F04B 53/18* | (2006.01) |
| *F04B 39/02* | (2006.01) |
| *F04C 29/02* | (2006.01) |
| *F01M 11/06* | (2006.01) |
| *F16N 19/00* | (2006.01) |

(52) U.S. Cl.
CPC ......... *F25B 31/002* (2013.01); *F01M 11/061* (2013.01); *F04B 39/0207* (2013.01); *F04B 53/18* (2013.01); *F04C 29/021* (2013.01); *F04C 29/028* (2013.01); *F25B 31/004* (2013.01); *F16N 19/006* (2013.01); *F25B 2400/075* (2013.01)

(58) Field of Classification Search
CPC .... F04B 39/0207; F04B 39/023; F04B 53/18; F25B 31/002; F25B 31/004; F25B 43/02; F16N 19/006; F01M 11/061; F04C 15/0088; F04C 15/0092; F04C 29/021; F04C 29/028

USPC ....... 417/228, 13, 281, 372, 423.13; 62/192, 62/193, 84, 468, 510; 418/97, 100

See application file for complete search history.

(56) References Cited

U.S. PATENT DOCUMENTS

| | | | | |
|---|---|---|---|---|
| 2,076,332 | A * | 4/1937 | Zercher ................. | F25B 31/002 184/6 |
| 2,253,623 | A * | 8/1941 | Jordan .................. | F25B 31/002 184/103.1 |
| 2,646,212 | A * | 7/1953 | Kellie ................. | F04B 39/0207 137/434 |
| 2,663,164 | A * | 12/1953 | Kurtz .................... | F25B 31/002 417/338 |
| 3,237,852 | A * | 3/1966 | Shaw ..................... | F04B 35/04 417/338 |

(Continued)

FOREIGN PATENT DOCUMENTS

CN          102778067 A          11/2012

*Primary Examiner* — Alexander Comley

(74) *Attorney, Agent, or Firm* — Carlson, Gaskey & Olds, PC

(57) ABSTRACT

Embodiments of the present invention provides an oil balancing apparatus, applied to at least three compressors connected in parallel. The oil balancing apparatus includes a first oil balancing pipe and a second oil balancing pipe. The first oil balancing pipe connects oil sumps of all the compressors, and the second oil balancing pipe only connects oil sumps of oil-rich compressors but not an oil sump of an oil-starved compressor.

14 Claims, 3 Drawing Sheets

(56) References Cited

U.S. PATENT DOCUMENTS

| | | | | |
|---|---|---|---|---|
| 3,500,962 A * | 3/1970 | Kocher | ............... | F04B 39/0207 184/103.1 |
| 3,785,169 A * | 1/1974 | Gylland, Jr. | ........ | F04B 39/0207 417/7 |
| 4,383,802 A * | 5/1983 | Gianni | ................... | F01M 11/12 417/12 |
| 4,551,989 A * | 11/1985 | Lindahl | ............... | F04B 39/0246 417/428 |
| 4,870,831 A * | 10/1989 | Kitamoto | ................ | F24F 3/065 417/3 |
| 5,094,598 A * | 3/1992 | Amata | ................ | F04B 39/0207 417/533 |
| 5,236,311 A * | 8/1993 | Lindstrom | .............. | F04B 25/00 417/254 |
| 5,327,997 A * | 7/1994 | Nash, Jr. | ............. | F04B 39/0207 184/103.2 |
| 5,542,499 A * | 8/1996 | Westermeyer | ........ | F16N 19/006 137/412 |
| 5,634,345 A * | 6/1997 | Alsenz | ................ | F04B 39/0207 184/7.4 |
| 5,996,363 A * | 12/1999 | Kurachi | .............. | F04B 39/0207 417/372 |
| 6,125,642 A * | 10/2000 | Seener | ................ | F04C 18/0215 184/103.1 |
| 7,651,322 B2 * | 1/2010 | Shaw | .................. | F04B 39/0207 417/228 |

\* cited by examiner

US 9,657,975 B2

OIL BALANCING APPARATUS AND REFRIGERATION DEVICE

CROSS-REFERENCE TO RELATED APPLICATION

This application claims priority of Chinese Patent Application No. 201210509434.5, filed on Dec. 3, 2012. The disclosure of the above application is incorporated herein by reference.

FIELD OF THE INVENTION

The present invention relates to the field of refrigeration technologies, and more particularly to an oil balancing apparatus and a refrigeration device.

BACKGROUND

A refrigeration system sometimes needs to use multiple compressors at the same time. For example, the manifolding of compressors is being used in the air conditioning and refrigeration industry more and more frequently. Compressors connected in parallel have advantages such as convenience in energy modulation, convenience in maintenance of a single shutdown compressor, and low cost. Lubrication oil is indispensable during running of the compressors. However, due to different displacements and different piping designs between the compressors, a compressor, especially a scroll compressor with a low-pressure chamber, may be damaged due to the lack of lubrication oil. Therefore, it is necessary to manage oil levels of multiple compressors. In conventional oil level management, active oil return apparatus are used in the freezing industry. These are not as applicable to commercial or light commercial air conditioning due to its high cost and complex system structure. Or, the oil level may also be managed by way of piping design, but this cannot effectively control the oil level of a compressor.

Thus, the conventional oil level management techniques cannot meet requirements of low cost and high reliability.

SUMMARY

In view of the above, an embodiment of the present invention provides an oil return apparatus between compressors connected in parallel.

Another embodiment of the present invention provides a refrigeration device with the oil return apparatus.

According to one aspect of the present invention, an oil balancing apparatus is provided, applied to compressors connected in parallel, where there are at least three compressors. The oil balancing apparatus includes a first oil balancing pipe and a second oil balancing pipe; the first oil balancing pipe connects oil sumps of the compressors, the second oil balancing pipe connects oil sumps of oil-rich compressors other than an oil sump of an oil-starved compressor.

Preferably, ports at which the first oil balancing pipe and the second oil balancing pipe are respectively connected to the oil sumps of the oil-rich compressors are at a same height as a standard oil level in the oil sumps of the compressors.

Preferably, a diameter of the first oil balancing pipe is greater than, equal to or less than that of the second oil balancing pipe.

Preferably, the oil sump of the oil-starved compressor is provided with an oil level switch, and the oil level switch is used to indicate closing one of the oil-rich compressors when an oil level of the oil-starved compressor is lower than a lowest safety oil level.

Preferably, the compressors connected in parallel are low-pressure chamber compressors, and share a discharge pipe and a suction pipe.

According to another aspect of the present invention, a refrigeration device is provided, where the refrigeration device uses the above oil balancing apparatus.

Specifically, the refrigeration device includes: multiple compressors connected in parallel, where the oil balancing apparatus is applied to the compressors connected in parallel.

Moreover, the refrigeration device further includes: a liquid separator, a liquid receiver, an expansion valve, an air-cooled or water-cooled condenser, a liquid pipe and a gas pipe coordinating with each other.

Preferably, the liquid pipe and the gas pipe are connected to an evaporator.

In embodiments of the present invention, two oil balancing pipes are configured. A first oil balancing pipe connects oil sumps of all the compressors and a second oil balancing pipe connects oil sumps of oil-rich compressors other than an oil sump of an oil-starved compressor. The oil-rich compressors connected by the second oil balancing pipe are equal to a larger compressor and will share the same/similar pressure. Thus, oil in the oil-rich compressors will flow only to the oil-starved compressor due to the pressure difference between the oil-rich compressor and the oil-starved compressor. Thus, the oil level of the oil-starved compressor can be restored much more quickly.

BRIEF DESCRIPTION OF THE DRAWINGS

Advantages of the present invention will become clearer and comprehensible through the following descriptions of embodiment with reference to the accompanying drawings, where.

DETAILED DESCRIPTION

The technical solution of the present invention will be described hereinafter in detail with reference to the embodiments and accompanying drawings. In the specification, the same or similar reference signs represent the same or similar components. The following description of embodiments of the present invention with reference to the accompanying drawings is to explain the general inventive concept of the present invention, but should not be construed as a limitation to the present invention.

An embodiment of the present invention provides an oil balancing apparatus, applied to a refrigeration system with multiple compressors, which can quickly and reliably ensure oil balance between compressors. In the refrigeration system, some of the multiple compressors may lack oil, and some may be rich in oil. The terms of "oil-starved compressor" and "oil-rich compressor" will be briefly described below.

An oil-starved compressor refers to a compressor where an oil amount is less than the standard oil amount or standard oil level for running the compressor, or the oil amount is relatively small compared with other associated compressors. On the contrary, an oil-rich compressor is a compressor where an oil amount is larger than the standard oil amount or standard oil level for running the compressor, or the oil amount is relatively large compared with other associated compressors. In an actual multi-compressor system, the oil-starved compressor and the oil-rich compressor may exist due to a practical running condition, or may be intentionally designed by a designer. For example, by designing different oil levels, different orders of oil supply or different oil consumption for the compressors in the system, oil in one or more compressors in the system is consumed to a level lower than a standard oil level/height before an oil level in the other compressors reaches a low level. This one or more compressors is an oil-starved compressor. Compressors with an oil level higher than a standard oil level/height are oil-rich compressors. In the present application, the term "oil" may be lubrication oil required during running of the compressors.

The oil balancing apparatus and the refrigeration device or air conditioner using the oil balancing apparatus according to the embodiment of the present invention are described hereinafter in detail with reference to the accompanying drawings.

Figure 1:
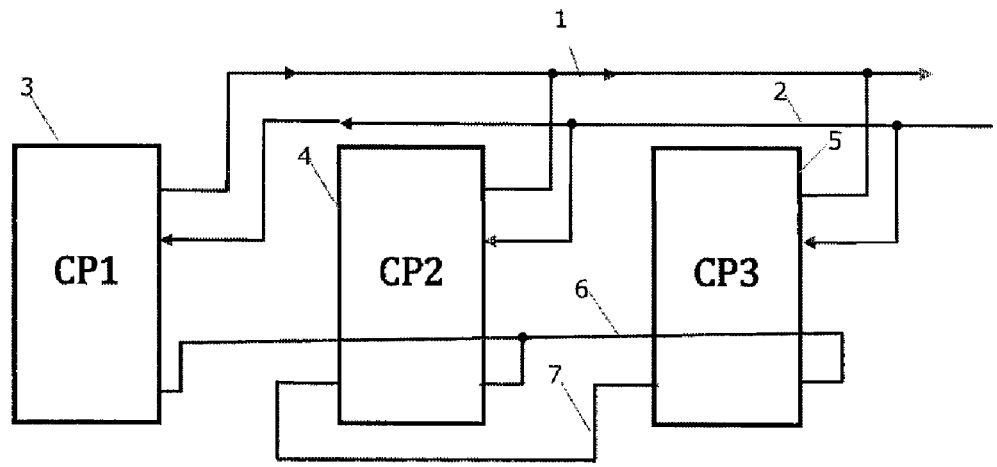
FIG. 1 is a schematic diagram of oil balancing apparatus applied to compressors connected in parallel in accordance with a second embodiment.

FIG. 1 shows an oil balancing apparatus according to an embodiment of the present invention, applied to compressors connected in parallel, wherein at least three compressors are connected in parallel. In this embodiment, for simplicity and clarity, the number of the compressors is set to be 3 (respectively compressors CP1, CP2, CP3, represented by reference signs 3, 4, 5 in FIG. 1), but it should be understood that, the number of the compressors is not limited thereto.

The oil balancing apparatus includes a first oil balancing pipe 6 and a second oil balancing pipe 7. The first oil balancing pipe 6 connects oil sumps of all the compressors 3, 4, 5, while the second oil balancing pipe 7 only connects oil sumps of oil-rich compressors, but not an oil sump of an oil-starved compressor. As shown in FIG. 1, the second oil balancing pipe 7 connects oil sumps of the compressors 4 and 5. Herein, it should be noted that, a pipeline intersection having a black dot in the pipelines shown in FIG. 1 indicates a point where two pipelines actually communicate or intersect, and likewise, an intersection without a black dot indicates a point where two pipelines do not communicate or intersect. On the other hand, for simplicity and clarity, points where the first oil balancing pipe 6 connects the compressor 3 and the compressor 5 are not distinguished with black dots because persons skilled in the art clearly and directly understand that the connecting point is a communicating or intersecting point.

In this embodiment, the piping can be designed according to displacements of the multiple compressors connected in parallel so as to make one compressor constantly short of oil (that is, an oil-starved compressor) while other compressors constantly rich in oil (that is, oil-rich compressors). The embodiments of the present invention set two oil balancing pipes, and the second oil balancing pipe 7 only connects oil sumps of the oil-rich compressors, and not the oil sump of the oil-starved compressor. Therefore, the time for supplying oil from the oil-rich compressors to the oil-starvation compressor is greatly shortened.

Figure 2:
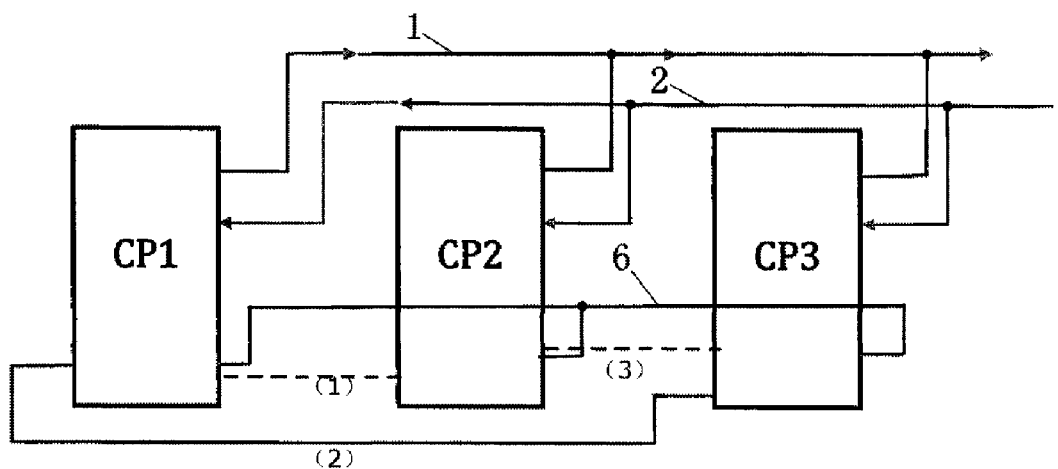
FIG. 2 is a schematic diagram of oil balancing apparatus applied to compressors connected in parallel in accordance with a third embodiment.

Specifically referring to FIG. 2 in combination with FIG. 1, the second oil balancing pipe only connects the oil sumps of the oil-rich compressors. This embodiment shows three different connecting manners of the second oil balancing pipe, represented with reference signs (1), (2) and (3) respectively. The specific connecting manner may be selected according to the actual condition of the system. Specifically, when the connecting manner (1) is used, the second oil balancing pipe connects the oil-rich compressors CP1 and CP2, while the compressor CP3 is an oil-starved compressor. Similarly, in the connecting manner (2), the second oil balancing pipe connects the oil-rich compressors CP1 and CP3, while the compressor CP2 is an oil-starved compressor. In the connecting manner (3), the second oil balancing pipe connects the oil-rich compressors CP2 and CP3, while the compressor CP1 is an oil-starved compressor.

According to the embodiments of the present invention, a diameter of the first oil balancing pipe 6 is greater than, equal to or less than that of the second oil balancing pipe 7. In the embodiment of the present invention, the oil-rich compressors are equivalent to a large compressor as an additional connecting pipe (the second oil balancing pipe is configured to connect the oil-rich compressors. Thereby, when the oil-starved compressor is short of oil, an oil pressure difference between the oil-starved compressor and the equivalent large compressor will push the lubrication oil to quickly flow from the oil sumps of the oil-rich compressors to the oil sump of the oil starved compressor through the first oil balancing pipe 6. Consequently, the oil level of the oil-starved compressor can be restored quickly.

It has been found in the present invention that, if there is only one oil balancing pipe connecting all the compressors, the oil level of the oil-starved compressor could not be restored as quickly as the above embodiment of the present invention. For example, as shown in FIG. 1 in which CP1 is the oil-starvation compressor, CP2 and CP3 are oil-rich compressors respectively. If no second balancing pipe 7 is configured, when the oil-starved compressor CP1 is short of oil and one of oil-rich compressors, e.g. CP2, stops running, the pressure in the oil-rich compressor CP2 will be increased and the lubrication oil in the oil-rich compressor CP2 will simultaneously flow to both the oil-starved compressor CP1 and the oil-rich compressor CP3 through the first oil balancing pipe 6. Thus, the lubrication oil at the oil-rich compressor CP3 would increase while it becomes more difficult for the lubrication oil level of the oil-starved compressor CP1 to be restored to the standard oil level. However, if the second oil balancing pipe 7 is configured between the oil-rich compressors, for example the compressors CP2 and CP3 as shown in FIG. 1, the second oil balancing pipe 7 can balance respective pressures within the oil-rich compressors CP2 and CP3 to make the oil-rich compressors have the same pressure and thus make the oil-rich compressors equivalent to a larger compressor with the same pressure. In such a case, even if any of the oil-rich compressors stops running, for example the oil-rich compressor CP2, the oil in the oil sumps of the oil-rich compressors will flow to the oil-starved compressor CP1 because the oil-rich compressors connected by the second oil balancing pipe 7 share the same pressure which is higher than the pressure in the oil sump of the oil-starved compressor. The oil level of the oil-starved compressor can thereby be restored more quickly, which ensures the secure running of the compressor system.

Figure 5:
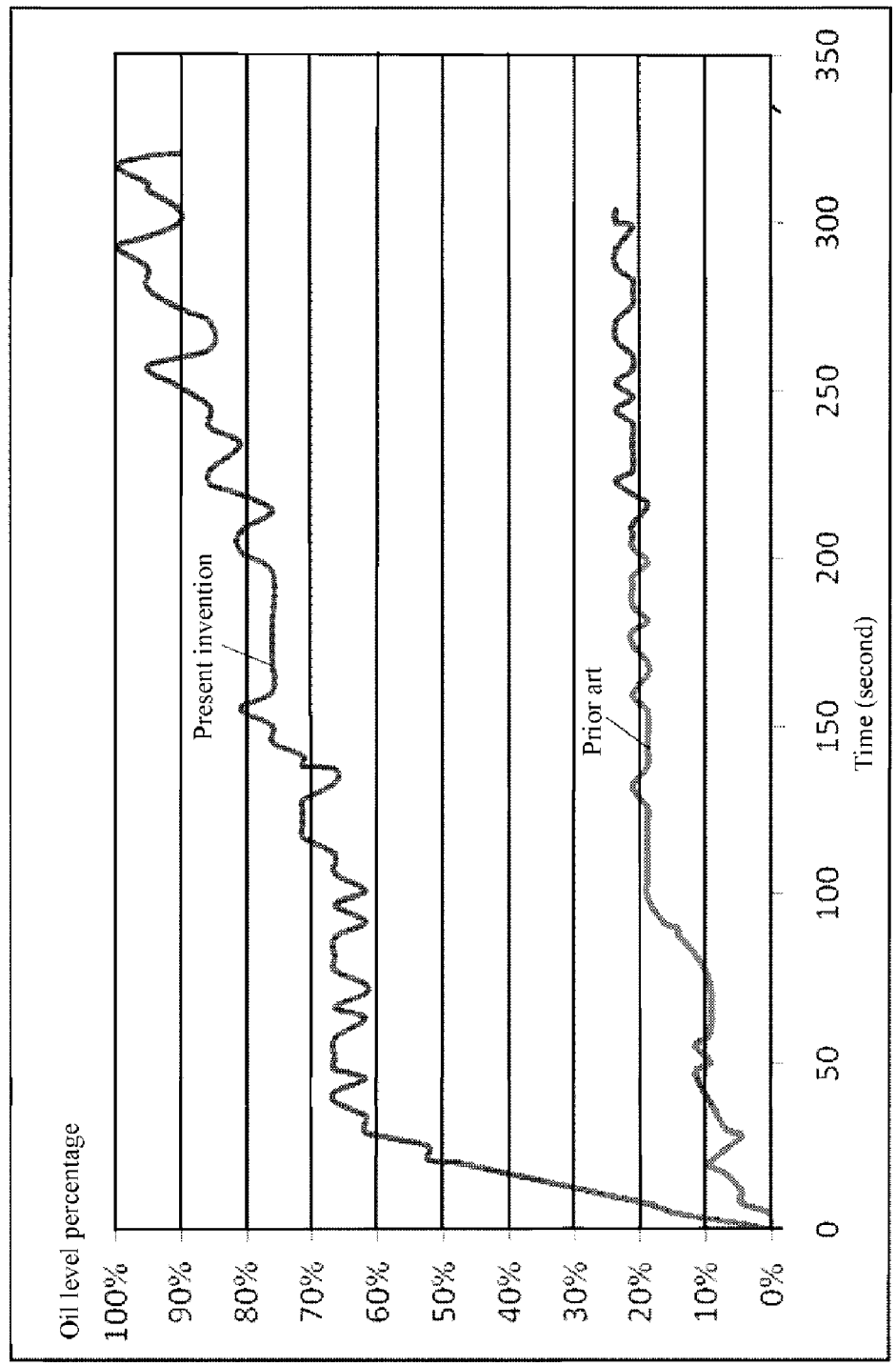
FIG. 5 is a graph showing a comparison of oil level return in an oil-starved compressor of the oil balancing apparatus shown in FIG. 3 and that of a conventional oil balancing apparatus.

The oil return curves of the embodiment of the present invention and the compressor system with only one oil balancing pipe are shown in FIG. 5.

It should be noted that, ports at which the first oil balancing pipe 6 and the second oil balancing pipe 7 are respectively connected to the oil sumps of the oil-rich compressors are at the same height as a standard oil level in the oil sumps of the compressors so that the oil-rich compressors would not have an oil level lower than the standard oil level. It should be noted that, the standard oil level is generally given during the design of a compressor. The standard oil level of a compressor may be different due to different designs for the compressor. In an embodiment of the present invention, the compressors may be low-pressure chamber compressors.

In case of manifolding of low-pressure chamber compressors, the compressors 3, 4, 5 (or more compressors) share a discharge pipe 1 and a suction pipe 2. Different displacements and piping designs of the compressors would make a compressor always stay in an oil-starvation state. The first oil balancing pipe 6 is used for balancing oil levels of the compressors during the running of the compressors. If the second oil balancing pipe 7 is not used and an oil-rich compressor stops running, the oil in the oil sump thereof flows toward other compressors through the first oil balancing pipe 6 due to a pressure difference, thus affecting the oil balance between the other compressors which are still running. However, as mentioned in the foregoing, even if one of the oil-rich compressors stops running, the oil-rich compressors connected by the second oil balancing pipe 7 are equivalent to a larger compressor with a higher pressure. This higher pressure pushes the oil in the oil-rich compressors to flow toward the oil-starved compressor through the first oil balancing pipe 6. Thus, the oil level of the oil-starvation compressor can be restored quickly. In addition, as the oil level of the oil-starved compressor can be restored quickly, it is thus not necessary to frequently stop/start the other oil-rich compressor(s) to accelerate the restoring the oil level of the oil-starved compressor. Such frequent stops/starts could reduce the cooling capacity and create pressure shocks on the compressor system. For example, if the oil sump of the oil-starved compressor is provided with an oil level switch, the oil level switch may indicate closing the oil-rich compressors to accelerate the restoring the oil level of the oil-starved compressor. It can be understood that, if a compressor is short of oil frequently, it may result in frequent starting and stopping of the oil-rich compressors.

Figure 3:
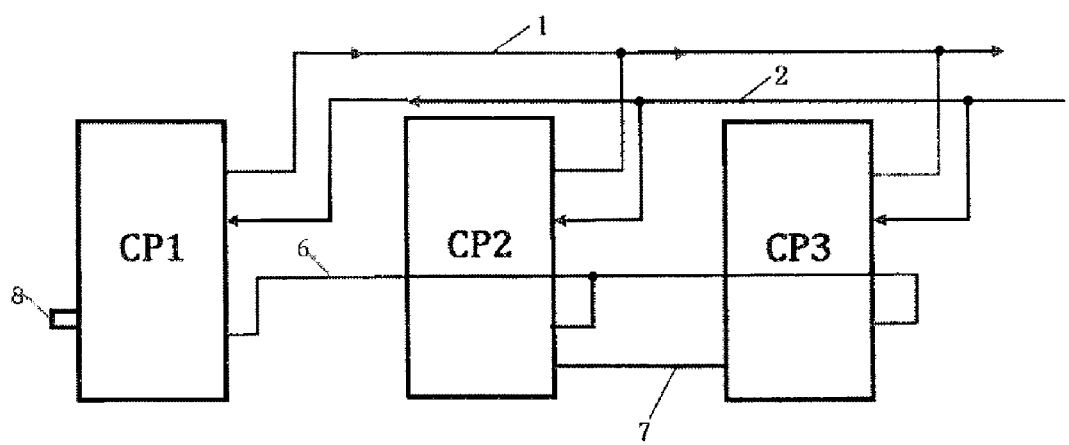
FIG. 3 is a schematic diagram of oil balancing apparatus applied to compressors connected in parallel, in which one of the compressor is provided with an oil level switch, in accordance with a fourth embodiment.

Referring to FIG. 3, another embodiment of the present invention shows that the oil sump of the oil-starved compressor is provided with an oil level switch, so as to control the lowest safety oil level in the oil sump. It can be seen from FIG. 3 that, the connecting manner of the second oil balancing pipe 7 is the connecting manner (3) shown in FIG. 2. That is, in the situation shown in FIG. 3, the compressor CP1 is an oil-starved compressor, and the compressors CP2 and CP3 are oil-rich compressors. As described previously, during the design of compressors, pipelines are designed according to compressor displacements, so that the compressor CP1 is constantly short of oil. When the oil level of the oil-starved compressor 3 is lower than the lowest safety oil level, the oil level switch 8 gives alarms, and one of the oil-rich compressors will be turned off or on, so as to supply oil from the oil-rich compressor to the oil-starvation compressor. Similarly, according to the actual condition of the system, different connecting manners (1), (2) and (3) of the second oil balancing pipe can be selected.

It should be understood that, in this embodiment, the oil sump of the oil-starved compressor is provided with an oil level switch, so that when the oil level of the oil-starved compressor is lower than the lowest safety oil level, the oil level switch indicates closing one of the oil-rich compressors. This will ensure that the oil is quickly returned to the oil-starved compressor. The lowest safety oil level herein may be the lowest oil amount for guaranteeing reliable running of the compressors. Similar to the "standard oil level," the lowest safety oil level is also given during the design of the compressor.

Figure 4:
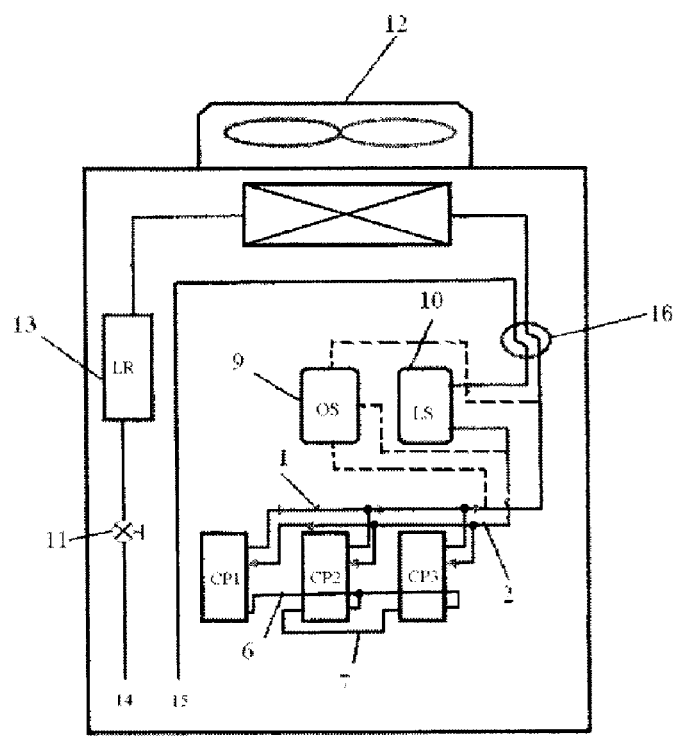
FIG. 4 is a schematic diagram of a refrigeration device using the oil balancing apparatus shown in FIG. 1.

FIG. 4 shows a refrigeration device (which may be an air conditioner) using the compressors connected in parallel and the oil balancing apparatus between the compressors shown in FIG. 3 of the present invention. According to actual applications, it can be selected whether the refrigeration device is provided with an oil separator, where an outlet of the oil separator may be connected to a suction side shared by the compressors. In FIG. 4, the refrigeration device or air conditioner includes a compressor system consisting of 3 parallel compressors CP1, CP2, CP3, an oil separator (OS) 9, a liquid separator (LS) 10, a liquid receiver (LR) 13, a water-cooled or air-cooled condenser 12 (or water-cooled device), an expansion valve 11, as well as a liquid pipe 14 and a gas pipe 15. The liquid pipe 14 and the gas pipe 15 are connected to an evaporator (not shown). Low-temperature low-pressure refrigerant gas from the evaporator enters the LS 10 through the gas pipe 15 and a four-way change valve 16 (if provided), and the separated gas enters the compressor through the suction pipe 2 to be compressed into high-temperature high-pressure refrigerant gas. The high-temperature high-pressure refrigerant gas enters the water-cooled or air-cooled condenser 12 through the discharge pipe 1 to be condensed into high-temperature high-pressure liquid; the liquid enters the LR 13, becomes low-temperature low-pressure refrigerant liquid through the expansion valve 11, and then enters the evaporator to be evaporated into low-temperature low-pressure refrigerant gas, thereby completing a cycle.

For a system provided with the LS 9 (pipelines associated thereto in the figures are shown with dashed lines). Oil in high-pressure refrigerant gas is separated in the LS 9 and returns to the compressor through an oil return pipe; the separated gas then passes through the water-cooled or air-cooled condenser 12, the LR 13, and the expansion valve 11 in sequence, and finally enters the evaporator to be evaporated into low-temperature low-pressure refrigerant gas, thereby completing a cycle.

A heat pump system may be provided with a four-way change valve 16 for switching between cooling and heating modes.

FIG. 5 is a graph showing a comparison of oil level recovery between an oil-starved compressor of the oil balancing apparatus of the present invention and an oil balancing apparatus in the prior art. The oil balancing apparatus of the present invention uses the connecting manner of two oil balancing pipes shown in FIG. 3. The oil balancing apparatus in the prior art only uses a single oil balancing pipe (that is, the first oil balancing pipe of the present invention).

It can be seen from the graph shown in FIG. 5 that, with the oil balancing apparatus of the present invention, the oil level of the oil-starved compressor can be restored to 70% within 2 minutes, which is obviously better than the result if only a single oil balancing pipe is used (in which the oil is only restored to 20% in 5 minutes).

Some embodiments of the general concept of the present invention have been displayed and described; persons of ordinary skill in the art should understand that, changes can be made to these embodiments without departing from the principle and spirit of the general inventive concept of the present invention, and the scope of the present invention is defined by the claims and their equivalents.

The invention claimed is:

1. An oil balancing apparatus, comprising;
   at least three compressors connected in parallel, with at least two of said compressors being oil-rich compressors, and at least one of said compressors being an oil-starved compressor; and
   the oil balancing apparatus comprises a first oil balancing pipe and a second oil balancing pipe, the first oil balancing pipe directly connecting oil sumps of all the compressors, the second oil balancing pipe directly connecting oil sumps of said at least two oil-rich compressors and not an oil sump of said at least one oil-starved compressor, such that oil may always flow freely between the at least two oil-rich compressors to equalize pressure between said at least two oil-rich compressors, wherein each of the oil-rich compressors has a predetermined standard oil level, and ports at which the first oil balancing pipe and the second oil balancing pipe are respectively connected to the oil sumps of the oil-rich compressors are at a same height as the predetermined standard oil level in the oil sumps of the compressors.

2. The oil balancing apparatus according to claim 1, wherein,
   a diameter of the first oil balancing pipe is greater than or equal to a diameter of the second oil balancing pipe.

3. The oil balancing apparatus according to claim 1, wherein,
   the oil sump of the oil-starved compressor is provided with an oil level switch, and the oil level switch is adapted to cause closing of oil flow of one of the oil-rich compressors when an oil level of the oil-starved compressor is lower than a lowest safety oil level.

4. The oil balancing apparatus according to claim 1, wherein,
   the compressors connected in parallel share a discharge pipe and a suction pipe.

5. The oil balancing apparatus according to claim 1, wherein a diameter of the first oil balancing pipe is less than or equal to a diameter of the second oil balancing pipe.

6. A refrigeration device, comprising;
   at least three compressors connected in parallel, with at least two of said compressors being oil-rich compressors, and at least one of said compressors being an oil-starved compressor; and
   an oil balancing apparatus comprising a first oil balancing pipe and a second oil balancing pipe, the first oil balancing pipe directly connecting oil sumps of all the compressors, the second oil balancing pipe directly connecting oil sumps of said at least two oil-rich compressors, and not an oil sump of said at least one oil-starved compressor, with said second oil balancing pipe equalizing pressure between said at least two oil-rich compressors by allowing oil to always flow freely between the at least two oil-rich compressors, wherein each of the oil-rich compressors has a predetermined standard oil level, and ports at which the first oil balancing pipe and the second oil balancing pipe are respectively connected to the oil sumps of the oil-rich compressors are at a same height as the predetermined standard oil level in the oil sumps of the compressors.

7. The refrigeration device according to claim 6, wherein,
   a diameter of the first oil balancing pipe is greater than or equal to a diameter of the second oil balancing pipe.

8. The refrigeration device according to claim 6, wherein,
   the oil sump of the oil-starved compressor is provided with an oil level switch, and the oil level switch is adapted to cause closing of oil flow of one of the oil-rich compressors when an oil level of the oil-starved compressor is lower than a lowest safety oil level.

9. The refrigeration device according to claim 6, further comprising:
   a liquid separator, a liquid receiver, an expansion valve, an air-cooled or water-cooled condenser, a liquid pipe and a gas pipe, which coordinate with each other.

10. The refrigeration device according to claim 9, wherein,
    the liquid pipe and the gas pipe are connected to an evaporator.

11. The refrigeration device according to claim 6, wherein,
    the compressors connected in parallel share a discharge pipe and a suction pipe.

12. The refrigeration device according to claim 6, further comprising:
    a liquid separator, a liquid receiver, an expansion valve, an air-cooled or water-cooled condenser, a liquid pipe and a gas pipe, which coordinate with each other.

13. The refrigeration device according to claim 12, wherein,
    the liquid pipe and the gas pipe are connected to an evaporator.

14. The refrigeration device according to claim 6, wherein a diameter of the first oil balancing pipe is less than or equal to a diameter of the second oil balancing pipe.

* * * * *